F. Seidle,
Horse Rake.
No. 44,344.          Patented Sep. 20, 1864.
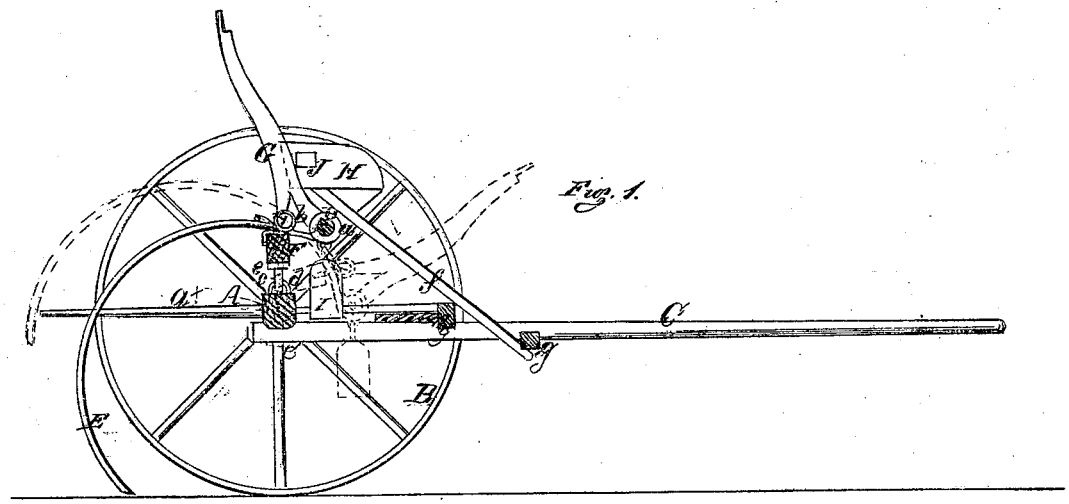
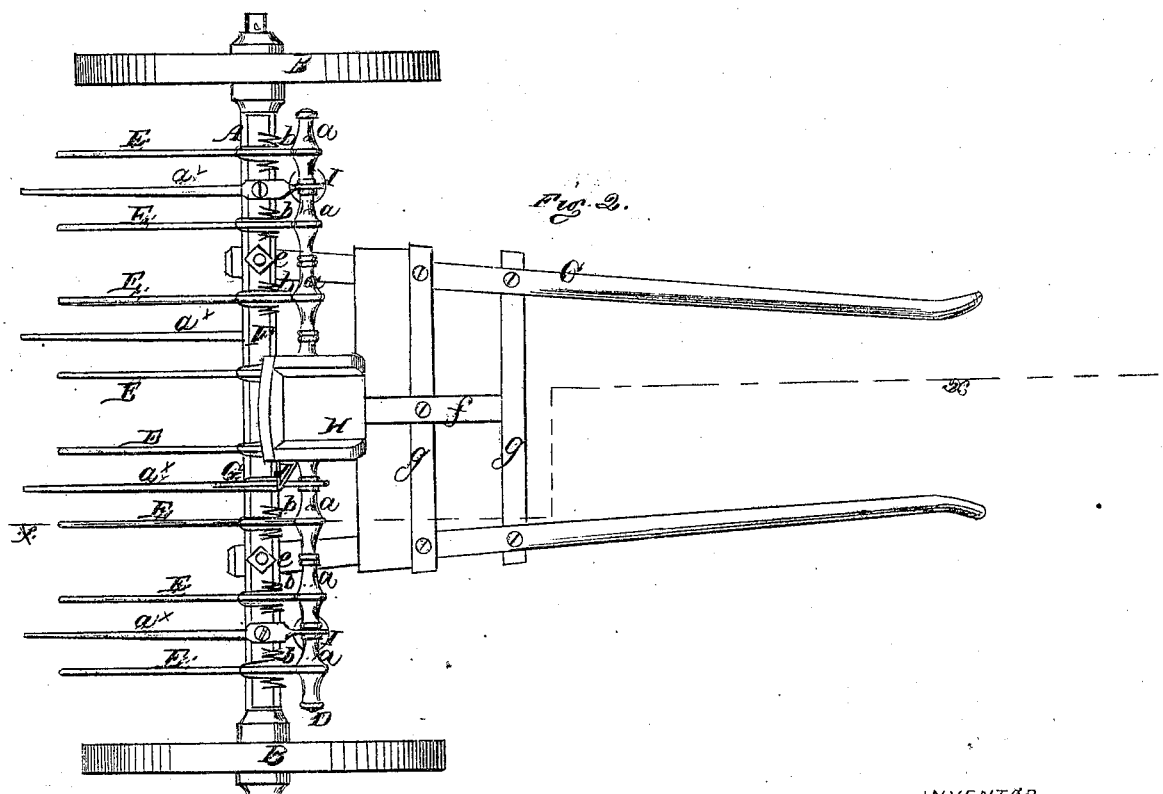
WITNESSES
Henry Morris
J.W. Coombs
INVENTOR
Fredrich Seidle

UNITED STATES PATENT OFFICE.

FREDERICK SEIDLE, OF MECHANICSBURG, PENNSYLVANIA.

IMPROVEMENT IN HORSE-RAKES.

Specification forming part of Letters Patent No. 44,344, dated September 20, 1864.

*To all whom it may concern:*

Be it known that I, FREDERICK SEIDLE, of Mechanicsburg, in the county of Cumberland and State of Pennsylvania, have invented a new and Improved Horse-Rake; and I do hereby declare that the following is a full, clear, and exact description of the same, reference being had to the accompanying drawings, making a part of this specification, in which—

Figure 1 is a side sectional view of my invention taken in the line $x\,x$, Fig. 2; Fig. 2, a plan or top view of my invention.

Similar letters of reference indicate corresponding parts in the two figures.

This invention relates to a new and improved horse-rake of that class which are provided with wire teeth; and it consists in a novel and improved manner of arranging and applying the same to the rake, whereby the construction of the same is much simplified and the teeth made to operate in a perfect manner, and also be capable of being adjusted higher or lower, as may be desired.

To enable those skilled in the art to fully understand and construct my invention, I will proceed to describe it.

A represents an axle, which has a wheel, B, on each end of it, and a pair of thills, C, of ordinary construction, attached to it.

D is a shaft, which is parallel with the axle A, and has a series of hubs, $a$, placed loosely upon it, to each of which the upper end of a wire tooth, E, is attached. These teeth E may be of the usual curved form, and each has a spiral spring, $b$, bearing upon it, said springs being attached to a bar, F, and having a tendency to keep the upper parts of the springs down upon said bar, as will be understood by referring to Fig. 1. This bar F is above and parallel with the axle A, and the former is attached to the latter by joints which are composed of hooks $c$, fitting in eyes $d$ in the upper surface of the axle. These hooks $c$ have screwthreads cut on their shanks, the latter passing through the bar F, and having nuts $e$ on their upper and lower ends. The hooks $c$ have their shanks passing through the thills C, with nuts $e'$ on their lower ends to secure the thills to the axle. The shaft D is connected to the lower end of a lever, G, which is attached to the bar F and extends upward by the side of the driver's seat H, which is supported by an inclined bar, $f$, connected to cross-pieces $g\,g$ of the thills C. The shaft D has weights I attached to it to serve as counterpoises to the teeth E, and the latter are retained or held in a working position by a stop, J, at one side of the driver's seat H, the lever G bearing against said stop.

From the above description it will be seen that when it is necessary to discharge the load gathered by the teeth E the driver shoves forward the upper end of the lever G past the stop J, and thereby raises the teeth, which, in consequence of being counterpoised, work with a very little effort on the part of the driver. The teeth E may be adjusted higher or lower, as circumstances may require, by turning the nuts $e$. The springs $b$ admit of an independent adjusting movement of each tooth, and it will be seen that the device is composed of but a very few parts, and therefore may be economically constructed. The axle A has clearing-teeth $a^x$ projecting from its back end, said teeth being arranged in the usual manner.

Having thus described my invention, what I claim as new, and desire to secure by Letters Patent, is—

The arrangement of bar F, connected to the axle A by joints or hinges, as shown, in combination with the teeth E, fitted on the shaft D, and connected to the bar F by springs $b$, and the lever G, all arranged to operate substantially as and for the purpose specified.

FREDERICK SEIDLE.

Witnesses:
M. M. LIVINGSTON,
HENRY MORRIS.